(12) United States Patent
Valliappan et al.

(10) Patent No.: US 7,707,168 B2
(45) Date of Patent: Apr. 27, 2010

(54) METHOD AND SYSTEM FOR DATA RETRIEVAL FROM HETEROGENEOUS DATA SOURCES

(75) Inventors: Ramasamy Valliappan, Singapore (SG); Yushi Cheng, Singapore (SG); Puay Siew Tan, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 419 days.

(21) Appl. No.: 10/915,732

(22) Filed: Aug. 10, 2004

(65) Prior Publication Data

US 2005/0165754 A1    Jul. 28, 2005

(30) Foreign Application Priority Data

Jan. 14, 2004  (SG)  ............... 200401249-8

(51) Int. Cl.
*G06F 17/30* (2006.01)
(52) U.S. Cl. ................ 707/602; 707/760
(58) Field of Classification Search ............ None
See application file for complete search history.

(56) References Cited

U.S. PATENT DOCUMENTS

| | | | |
|---|---|---|---|
| 5,634,053 A | 5/1997 | Noble et al. | |
| 5,953,716 A | 9/1999 | Madnick et al. | |
| 6,009,422 A * | 12/1999 | Ciccarelli | 707/4 |
| 6,078,914 A * | 6/2000 | Redfern | 707/3 |
| 6,282,537 B1 * | 8/2001 | Madnick et al. | 707/4 |
| 6,829,599 B2 * | 12/2004 | Chidlovskii | 707/3 |
| 6,976,018 B2 * | 12/2005 | Teng et al. | 707/3 |
| 7,058,626 B1 * | 6/2006 | Pan et al. | 707/4 |
| 7,133,863 B2 * | 11/2006 | Teng et al. | 707/3 |
| 7,171,415 B2 * | 1/2007 | Kan et al. | 707/10 |
| 2003/0176929 A1 * | 9/2003 | Gardner | 700/17 |

FOREIGN PATENT DOCUMENTS

WO    WO 00/75849 A2    12/2000

* cited by examiner

*Primary Examiner*—John E Breene
*Assistant Examiner*—Thu-Nguyet Le
(74) *Attorney, Agent, or Firm*—Knobbe Martens Olson & Bear LLP

(57) ABSTRACT

A system and a method for specifying and configuring, together with categorising and classifying, heterogeneous types of multiple data sources is disclosed. The system and method also retrieve search results in accordance with search requests and conditions from at least one of the multiple data sources, for example a relational database management system (RDBMS), a light-weight directory access protocol (LDAP), an extensible mark-up language database (XMLDB), extensible mark-up language (XML) files, hypertext mark-up language (HTML) files, or TEXT files, through an application programming interface (API), or a web service interface such as a simple object access protocol (SOAP).

19 Claims, 6 Drawing Sheets

METHOD AND SYSTEM FOR DATA RETRIEVAL FROM HETEROGENEOUS DATA SOURCES

FIELD OF INVENTION

The invention generally relates to data retrieval from heterogeneous data sources, and more particularly, to specifying and configuring multiple types of data sources, for information searching and retrieval from the different types of data sources through a network interface.

BACKGROUND

Data storage of data and information and search and retrieval of the stored information through a network interface are significant tasks performed by computer systems. These tasks are complicated by the number of different types of data storage sources or stores that are available and by the number of different types of applications that are available to access and search the data sources. Often, some of the data sources are incompatible with the search or access application, which makes the search and retrieval of the data and information stored on the incompatible data sources impossible. To access incompatible data sources, the application must incorporate the accessing and searching logic and codes of each data source type desired. Writing such code is usually more complex and requires more effort to program than other types of programming code. Each data source typically has a set of query languages or a search engine to perform information retrieval or searching. The languages or search engine are usually unique to each data source.

Additionally, searches performed on the Internet, such as a web-wide search, span millions of web pages. Another type of search is an enterprise-type search, which typically indexes a much smaller, but much more varied set of content types. The web-wide type searches are less specific than enterprises-type searches, and users or requesters performing enterprise-type searches typically require access to different types of data sources.

Attempts have been made to provide systems to retrieve or search information resident in multiple data sources. U.S. Pat. No. 5,634,053 issued 27 May 1997 to Noble et al. describes a federated information management (FIM) system and method for integrating data from multiple databases to provide users with access to a virtual database. The FIM system provides a uniform user interface, however, the multiple databases mentioned are of a similar type, specifically, database management system (DBMS).

International Patent Publication No. WO-A-00/75,849 published 14 Dec. 2000 to Lackey et al. discloses a middleware system that provides access to disparate data sources, such as relational and non-relational databases, multidimensional databases, objects and extensible mark-up language (XML) files. The system of WO-A-00/75,849 provides access to different types of data sources, but only configures the properties of the data source, which enables the application to create a connection for the data source without configuring the search and returnable attributes required for searching. In essence the system of WO-A-00/75,849 provides flexible connectivity to a single data source, but does not provide such flexible and configurable data retrieval from heterogeneous data sources.

Attempts also have been made to provide systems for querying heterogeneous data sources distributed over a network using context interchange. U.S. Pat. No. 5,953,716 issued 14 Sep. 1999 to Madnick et al. describes a system for querying disparate, heterogeneous data sources over a network that includes a request translator and a data translator. The request translator translates a request having an associated data context declared by the requester into a query having a second data context associated with it. The second context is also associated with the query and is declared by, at least one of the disparate data sources. This system also includes a data translator, which translates received data from the data context declared by the data source queried into the data context associated with the request. A related method for querying disparate data sources over a network is also described. The method includes the steps of translating a request having an associated data context into a query having a second data context. The second data context is associated with one of the disparate data sources to be queried. The method further includes translating data received from the data sources, from the data contexts associated with the data sources, into the data context associated with the request.

The above systems are unable to support different types of data sources and dynamically identify applicable types of data sources, or dynamically define the scope of a search.

Thus, a need exists for a method or a system to address the problems discussed above for data access, search, or retrieval from multiple heterogeneous data sources.

SUMMARY

According to one aspect of the present invention, there is provided a system for searching and retrieving data from heterogeneous data sources through a network interface. The system comprises: a plurality of heterogeneous data sources; a configure element for communicating with each data source and for configuring and selecting the data sources from which to retrieve data; a search element for communicating with the configure element and each selected data source, for retrieving data in accordance with a task request; and a search translator for each data source, to communicate with both the configure element and the search element.

According to another aspect of the present invention, there is provided a method for searching and retrieving of data from heterogeneous data sources, through a network interface. The method comprises: in a configure element in communication to each data source, configuring and selecting data sources from which to retrieve data, from a plurality of heterogeneous data sources; and retrieving data in accordance with a task request, using a search element in communication with the configure element and each selected data source; wherein communication between the data sources and the configure element and the search element is via search translators.

BRIEF DESCRIPTION OF THE DRAWINGS

These and other features, objects and advantages of embodiments of the invention will be better understood and readily apparent to one of ordinary skill in the art from the following written description, in conjunction with drawings, in which.

DETAILED DESCRIPTION

A system and method are disclosed for specifying or configuring, together with categorising or classifying, various types of multiple data sources. The system and method retrieve search results from the various types of data sources via a network interface. Examples of the various type of data sources may include, for example, a relational database management system (RDBMS), a light-weight directory access protocol (LDAP), an extensible mark-up language database (XMLDB), extensible mark-up language (XML) files, hyper-text mark-up language (HTML) files, TEXT files, and the like. Pre-configuration and pre-categorisation of search categories may be performed during deployment before actual search (information retrieval) takes place. Both the configuration and the categorisation of various types of multiple data sources may be implemented via an application programming interface (API) or a web service, such as a simple object access protocol (SOAP), calls or invocations with the help of a data source configurator element.

Figure 1:
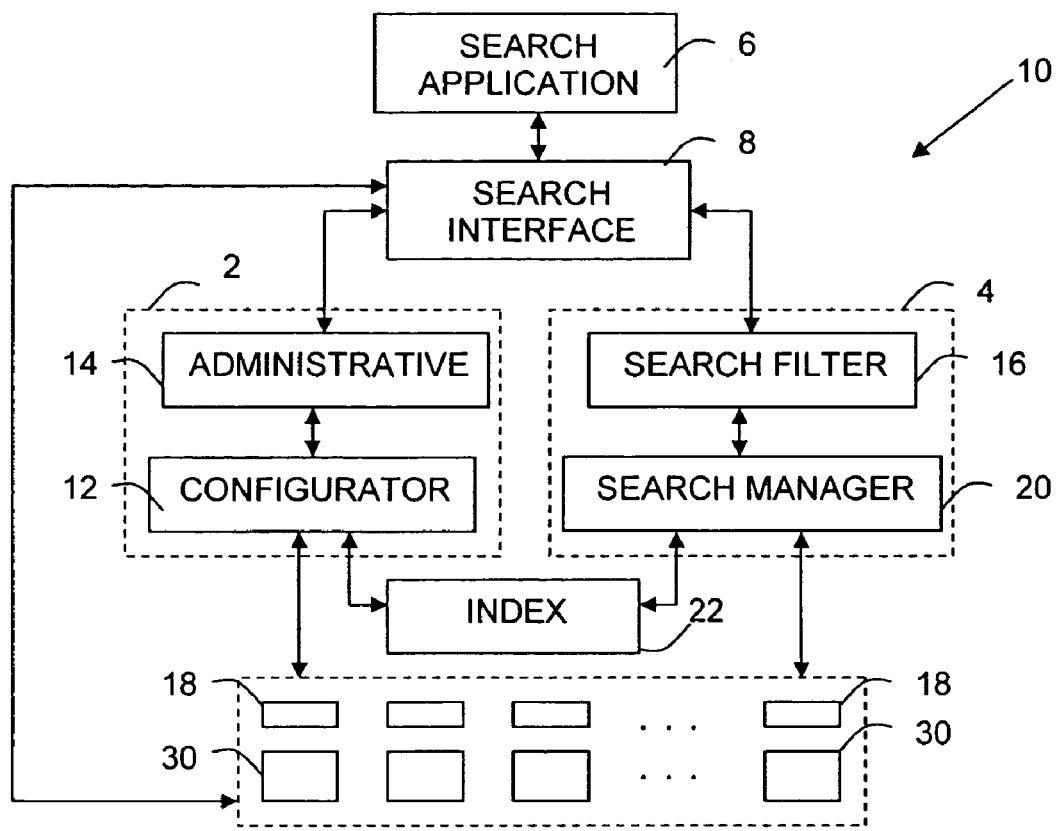
FIG. 1 is a block diagram of the system of an embodiment of the invention.

FIG. 1 shows an embodiment of the system 10 having a configure element 2 having an administrative element 14 in communication with a data source configurator 12. The system 10 also has a search element 4 comprising a search manager (search control engine) 20 in communication with a search filter engine 16. A search translator 18 is provided for each data source 30. The search translator 18 of each particular type of data source 30 may be required to communicate with the search elements 4 and/or the configure elements 2. A search application 6 invokes a network interface, which is a search interface 8, such as SOAP and API, which is in communication with the administrative element 14 and the search filter engine 16. The system 10 also comprises a meta-file or master index 22 in communication with the data source configurator 12 and the search manager 20. The data source configurator 12 and the search manager 20 are also in communication with the data sources 30. Moreover, the search translators 18 are also in communication with the data sources 30.

Figure 2:
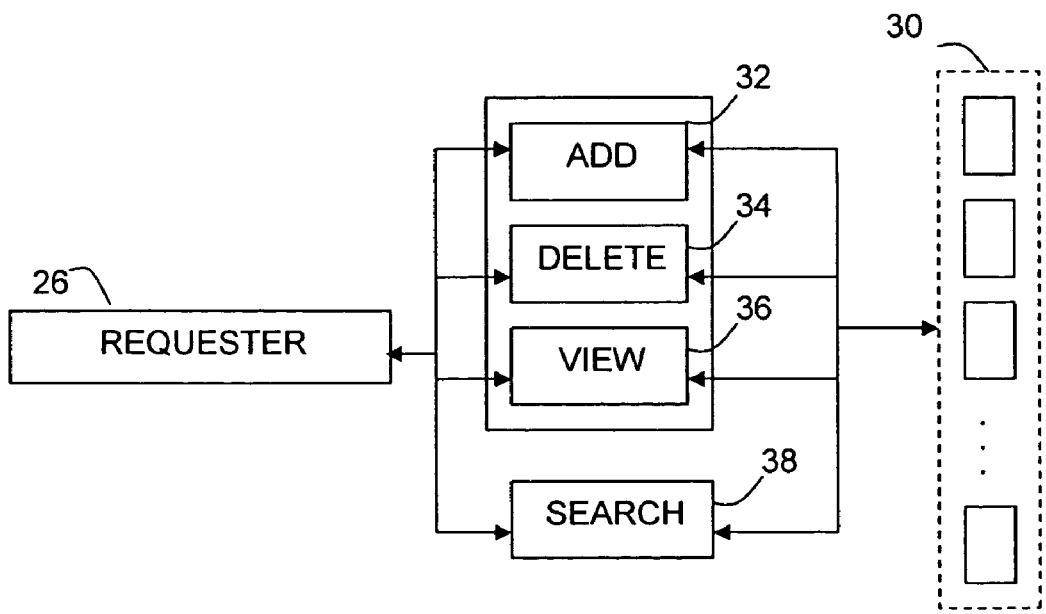
FIG. 2 is a block diagram of an example of an administrative element from within FIG. 1.

FIG. 2 illustrate exemplary options for configuring and categorising of data sources 30 that available in the administration element 14 of FIG. 1, such as, adding 32, deleting 34, or viewing 36 a data source 30. During a search 38 operation a requester 26 selects one or more search terms and other pertinent information relating to the proposed search 38 in the search filter engine 16 to form a retrieval task. The requester 26 also selects the type of data sources, for example RDBMS, LDAP, XMLDB, XML, HTML, TEXT and the like, or the category of data sources, for example NEWS, USERS, GROUPS, TRANSACTIONS, of data sources 30 to be included for information search and retrieval. The requester 26 may be a user or an application or a combination of the two, each performing different functions.

The retrieval task and information on the data sources to be included are sent to the search manager 20. The search manager 20, in turn, formulates a task request, such as a search request, for the relevant selected type or category of data sources, and forwards the formulated search request to the appropriate search translators 18 that correspond to the specified type or category of data sources 30 to be searched. The search translators 18 for the relevant data sources 30 issue their respective search requests to the corresponding data sources 30. The search translators 18 verify that the search request syntax is appropriate to its corresponding data source type. The search translators 18 use the respective search requests to retrieve the search results from their corresponding data sources 30. Searches are carried out in accordance with the retrieval task on the selected pre-configured different types of multiple data sources 30. Search results from each of the pre-configured data sources 30 are returned by the search manager 20 back to the requester 26.

Figure 3:
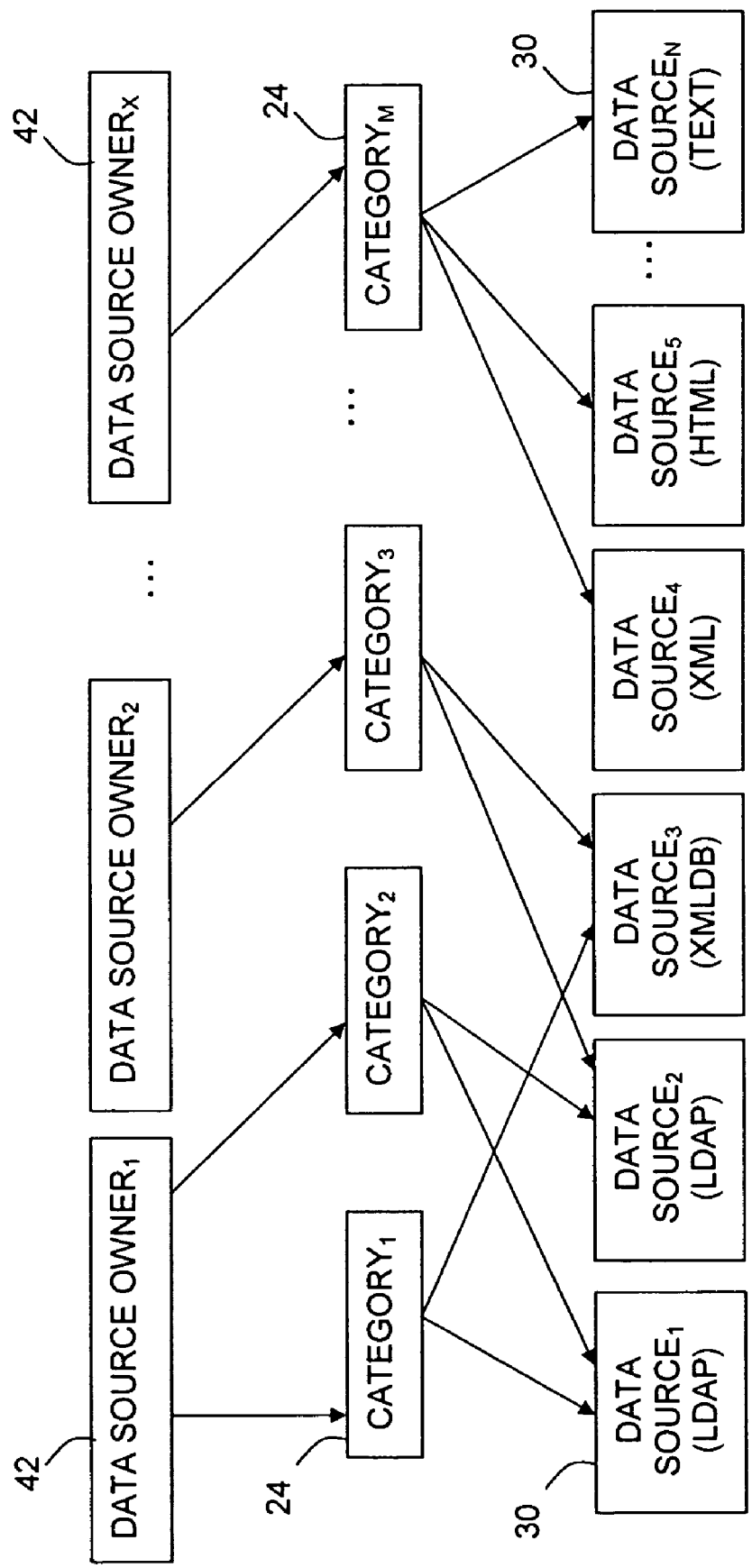
FIG. 3 is a flow diagram of a data source configuration and categorisation operation of an embodiment of the invention.

Pre-configured data sources as mentioned above may be those data sources 30 that are configured and categorised during the data source configuration and categorisation operation as shown in FIG. 3. The data source owner 42 may configure which of the data source(s) 30 can be searched. The data source owner 42 may also specify the types of the data sources (RDBMS, XMLDB, LDAP, XML, HTML, TEXT files, etc.) and the generic search categorisation(s) or classification(s) 24 of the data sources (NEWS, USERS, GROUPS, TRANSACTIONS, etc.), under which the data sources 30 fall.

In this embodiment, the data source owner 42 specifies or configures, and verifies the various types of data sources 30 required by the requester 26. For example, the data source owner 42 specifies or configures the information or properties of the required data sources, searchable attributes, returnable attributes, and the like under generic categories into the search master index meta-file 22. The search manager 20 classifies and executes different kinds of searches with the help of the search filter engine 16 and the search translators 18 on those pre-configured data sources 30 based on any one of: data source type, data source category 24 and the data source owner 42 who configured the data source(s). The search filter engine 16 is configured to receive search information, the data source type or category, and information of the data source owner that configured the data source.

Search translators 18 such as SQL, X-QUERY, XPATH, Netscape Directory SDK 4.0 for Java, and the like, retrieve search results from the various data sources 30 respectively, based on the search information and the data source type or category 24 or the data source owner 42 that configured the search forwarded by the search filter engine 16. The search manager 20 formulates a particular search request using the search information passed on by the search filter engine and formulates the appropriate syntax information specific to its corresponding data source type. The search translators 18 use the respective search requests to retrieve the search results from their corresponding different types of multiple data sources 30.

FIG. 3 shows a data source configuration and categorisation operation of an embodiment of the invention. As shown, each data source owner 42 specifies a set of categories 24 under which one or more heterogeneous data sources 30 can be configured for data retrieval. Each specified category 24 configures at least one data source 30. FIG. 3 shows one example of the data sources 30 that are configured and categorised by the data source owners 42 (data source owner$_1$-data source owner$_X$) and categories 24 (category$_1$-category$_M$). This data source configuration and categorisation are the pre-configured data sources 30 (data source$_1$-data source$_N$), shown as arrows between levels. During the data source configuration and categorisation operation, various access levels are established and maintained, which provides more access control by way of data source owners level, data source categories level, and data source types level, to the requester 26. The data source owners 42, categories 24, and data sources 30 may be configured and/or categorised in any combinations.

Figure 4:
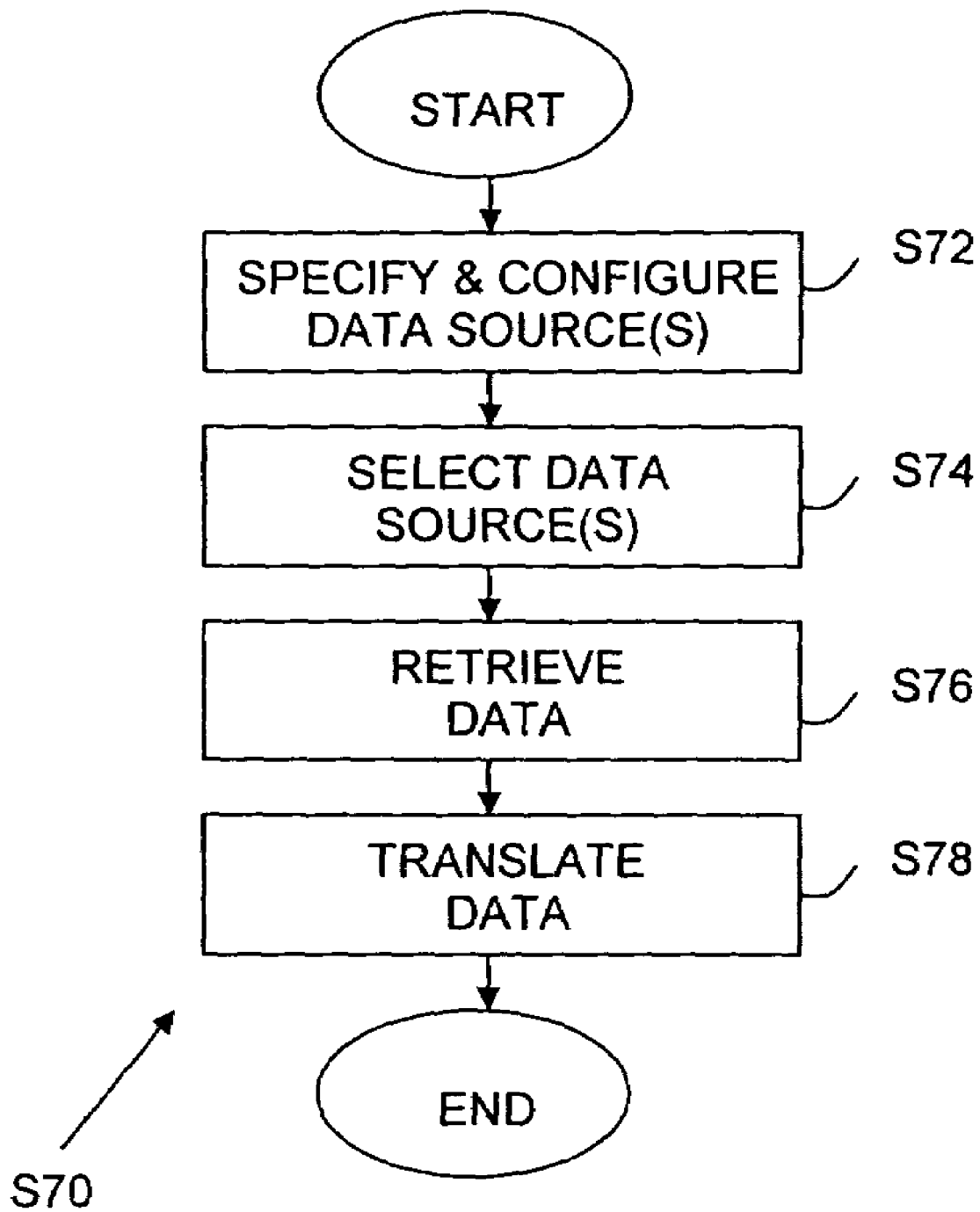
FIG. 4 is flow chart of a configuration and categorisation method.

During the configuration and categorisation operation as shown in FIG. 4 and with reference to FIG. 1, an embodiment of a method S70 comprises the data source owner specifying or configuring S72 which of the data source(s) 30 are to be searched along with their respective data source types and generic search categorisation(s) or classification(s) that those data source(s) fall under. The data source(s) is selected S74, and data is retrieved S76. The data is translated via the search translators S78.

Figure 5:
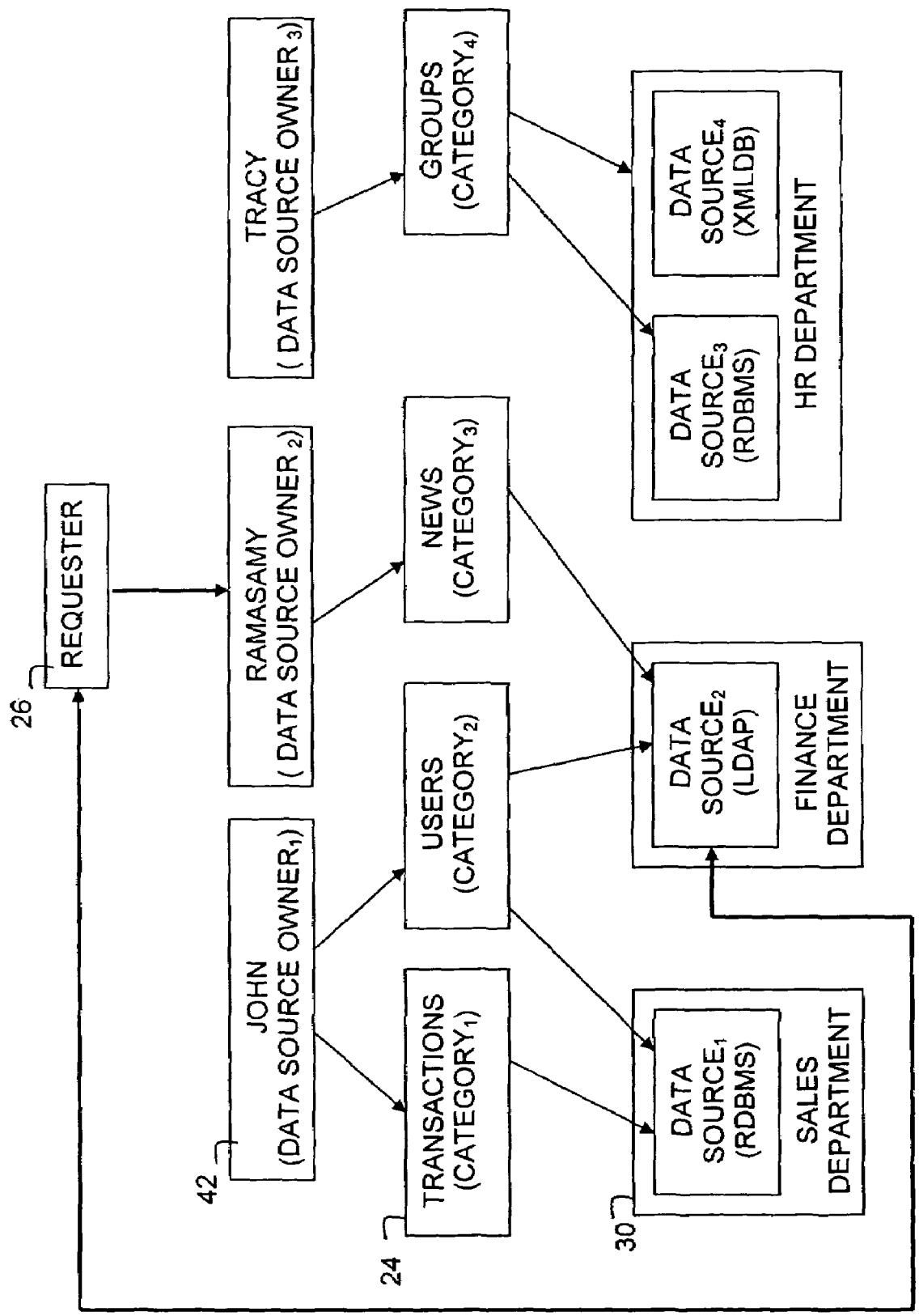
FIG. 5 is a flow diagram of a requester's access control and search operation (search by data source owner) of an embodiment of the invention.
Figure 6:
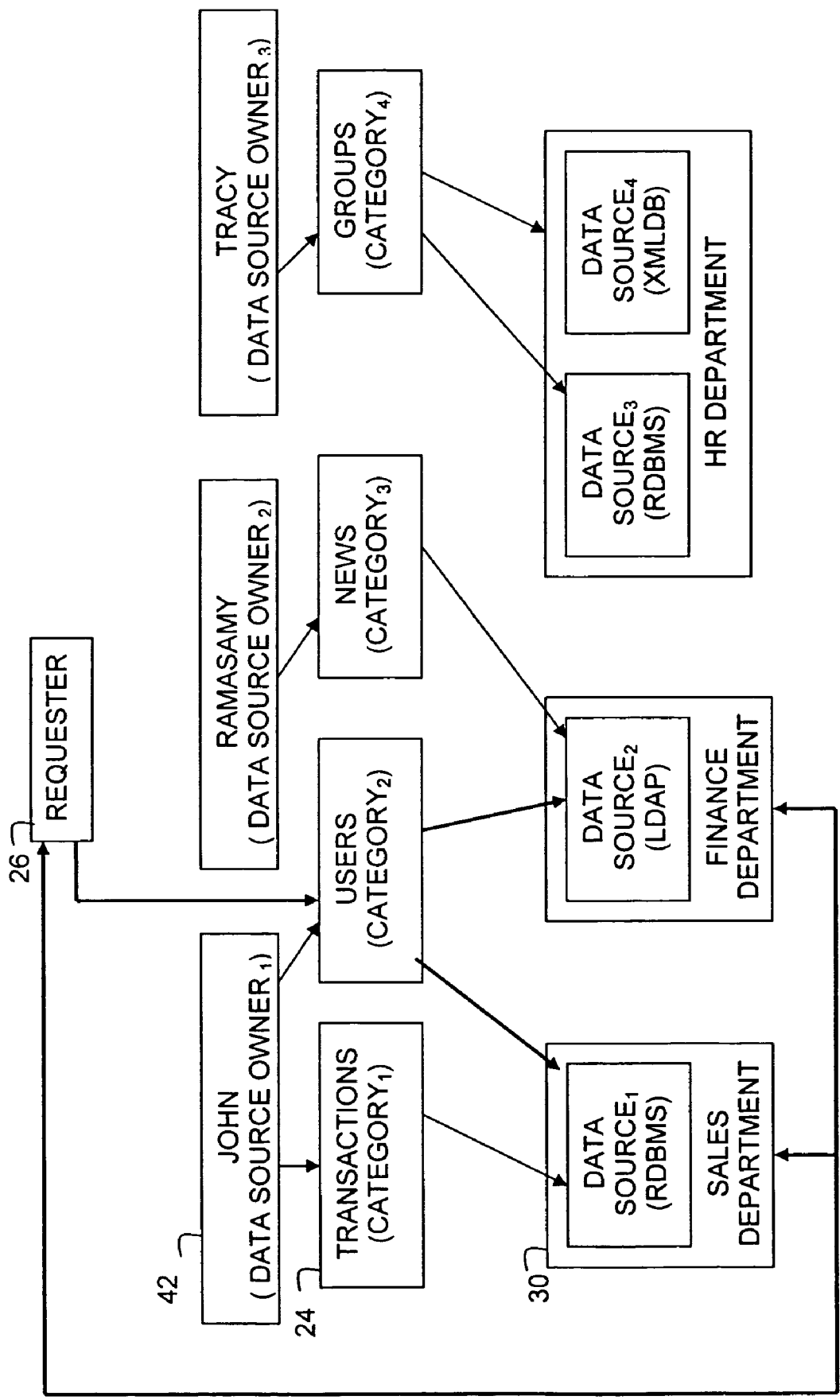
FIG. 6 is a flow diagram of a requester's access control and search operation (search by data source category) of an embodiment of the invention.
Figure 7:
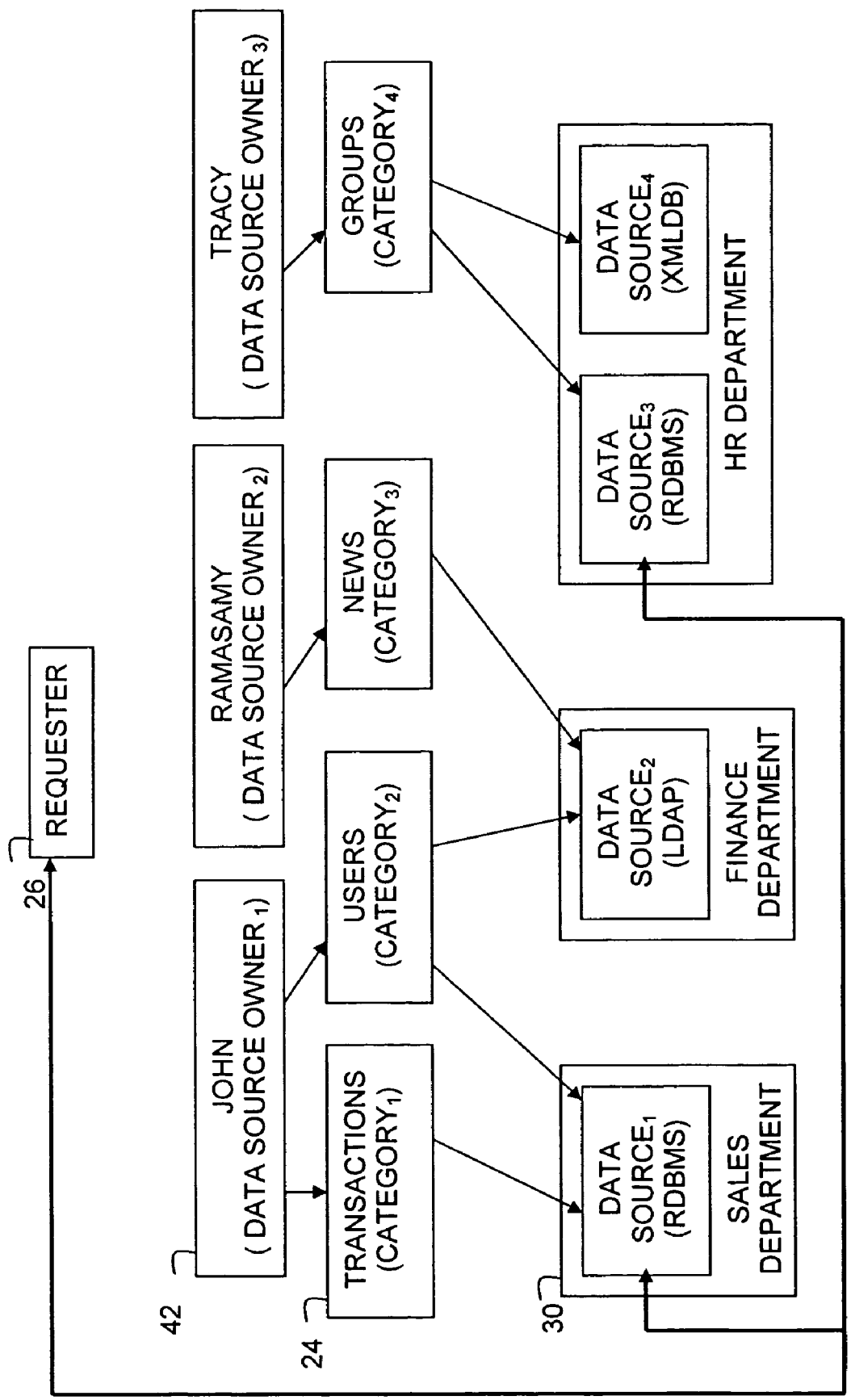
FIG. 7 is a flow diagram of a requester's access control and search operation (search by data source type) of an embodiment of the invention.

FIGS. 5 to 7 illustrate access control of data sources that is provided to the requester 26 in relation to the data source owners 42, the categories 24 or the data sources types 30. The data sources 30 may be of any type, for example, types that are commonly found in departments such as sales department (RDBMS), finance department (LDAP), human resource department (RDBMS or XMLDB). Each requester 26 is allowed to perform search and data retrieval based on those pre-configured and pre-categorised data sources at various access levels based on any of the following:

1) search by data source owners 42, for example, ramasamy (data source owner$_2$) as shown in FIG. 5;
2) search by data source categories 24, for example, users (category$_1$) as shown in FIG. 6; or
3) search by data source types 30, for example, RDBMS (data source$_3$) as shown in FIG. 7.

An example of "search by data source owners" is shown in FIG. 5. A particular data source owner 42, for example "ramasamy" (data source owner$_2$), configures multiple data sources 30 of various types such as RDBMS, LDAP, XMLDB, XML, HTML, TEXT files, and the like, under different categories. The requester 26 may perform a search or data retrieval on all those data sources pre-configured and pre-categorised (during the data source configuration and categorisation operation) by that particular data source owner 42, "ramasamy" (data source owner$_1$). Such a search or data retrieval might use the command: searchByUser(">20 && <30", "ramasamy").

An example of "search by data source categories" is shown in FIG. 6. Multiple data sources 30 of various first types, such as RDBMS, LDAP, and the like, are configured and categorised under a particular first category 24, for example "USERS". Multiple data sources 30 of various second types, such as XML, TEXT files, and the like, are configured and categorised under a particular second category 24 for example "NEWS". The requester 26 may perform a search or data retrieval on all data sources that are pre-configured (during the data source configuration and categorisation operation) under a specific category for example "USERS" (category$_2$) (or "NEWS)". Such a search or data retrieval might use the command: searchByCategory("kumar", "USERS").

An example of "search by data source types" is shown in FIG. 7. Multiple data sources 30 of various types, such as RDBMS, LDAP, XMLDB, XML, HTML, TEXT files, and the like, are configured. The requester 26 may perform a search or data retrieval on all those data sources pre-configured (during the data source configuration and categorisation operation) for that specific data source type, for example "RDBMS" (data source$_1$, data source$_3$). Such a search or data retrieval might use the command: searchByType("ashok*", "RDBMS").

The master index 22 meta file may comprise elements of information, such as are exemplified in Table I below.

TABLE 1

| NAME | DESCRIPTION | EXAMPLE |
| --- | --- | --- |
| Data Source ID | A unique ID automatically generated by the system, which corresponds to the new data source being configured. | 1 |
| Data Source Owner Name | Name of the data source owner which configures and categorises the new data source. | ramasamy |
| Password | Password of the above mentioned data source owner which configures and categorises the new data source. | tesing143 |
| Data Source Location | The data source location refers to the network accessible IP address and port of the data source. | http://192.168.20.9:1521 |
| Data Source Type | The type of the data source, such as RDBMS, XMLDB, LDAP, XML, HTML, TEXT, etc. | RDBMS |
| Data Source Category | The category under which the data source falls, such as USERS, GROUPS, TRANSACTIONS, NEWS, LOGS, etc. which is specified by the data source owner during the data source configuration and categorisation. | USERS |
| Data Source Name | The data source name refers to the collection names in the case of XMLDB, the database names in the case of RDBMS and LDAP or the directory (i.e. absolute path) names in the case of XML, HTML or TEXT files. | webs |
| Data Source User Name | The data source user name refers to any valid user name who can access the data source. | usc |
| Data Source Password | The data source password refers to any valid password of the above mentioned valid user name who can access the data | uscpass |

TABLE 1-continued

| NAME | DESCRIPTION | EXAMPLE |
|---|---|---|
| | source. | |
| Data Source | The data source refers to the table names in the case of RDBMS, schema names in the case of XMLDB, object names in the case of LDAP or file names in the case of XML, HTML, TEXT files. | PAF_FSC_DATASOURCE |
| Searchable Fields | The searchable fields/attributes refers to the column names in the case of RDBMS, XML tag names in the case of XMLDB, or attribute names in the case of LDAP. | DATASOURCEID, DATASOURCELOCATION, DATASOURCEUSERNAME, DATASOURCEPASSWORD, DATASOURCENAME |
| Returnable Fields | The returnable fields/attributes refers to the column names in the case of RDBMS, XML tag names in the case of XMLDB, or attribute names in the case of LDAP. | DATASOURCEOWNER, DATASOURCETYPE, DATASOURCECATEGORY |

Examples of some search strings, search conditions, or other search task requests are shown in Table 2.

TABLE 2

| SEARCH STRING | DESCRIPTION |
|---|---|
| "ashok*" | Search for strings starting with "ashok" in all the pre-configured searchable character/string fields of the data sources. |
| ">20 && <30" | Search for numbers greater than 20 and less than 30 in all the pre-configured searchable numeric fields of the data sources. |
| "??mar" | Search for strings having two characters in the front of the specified characters "mar" in all the pre-configured searchable character/string fields of the data sources. |
| ">= '01-10-2003' && <= '31-10-2003'" | Search for dates more recent than '01-10-2003' and older than '31-10-2003' in all the pre-configured searchable date fields of the data sources. |
| "male" | Search for strings exactly matching "male" in all the pre-configured searchable character/string fields of the data sources. |

With this configuration, the system provides flexibility to specify and configure different types of data source(s) under various generic categories and classifications for information or properties like searchable attributes, returnable attributes, and the like. For example, as shown in FIG. 2, the requester 26 may add a data source 32, delete a data source 34, or view a data source 36. Based on the configuration completed by the requester 26, the selected data sources 30 are searched 38. Additionally the system has the ability to handle and execute searches on different types or categories of data source(s) 30 (global as well as user-configured), for example RDBMS, LDAP, XMLDB, XML files, HTML files, TEXT files and the like. The System also facilitates information search execution and retrieval from a variety of pre-configured data source(s) belonging to different types or categories at any point of time and returns the search or retrieval results. Embodiments may use different types of data sources that are pre-configured and may be categorised or classified accordingly. Information search and retrieval from different types of multiple data source(s) (global and user-configured) may be realised. The search results from multiple pre-configured data source(s) of different types are returned back to the requester 26.

The system and method may be implemented on a computer, for example by way of software, connected to one or more networks, such as the internet or proprietary internal networks, for example, to specify and configure different types of data source(s) information that are accessible through such networks. It is understood that the computer may receive input from a user via a user interface, store various types of data on a data storage medium, display information, and output information to the user. Additionally, the system may indicate, organise, and maintain the searchable and returnable attributes for the pre-specified or pre-configured types of data source(s). Common or generic search categories (such as NEWS, GROUPS, TRANSACTIONS, USERS, LOGS, etc.) may be established for the pre-specified or pre-configured types of data source(s). Different kinds of searches may be performed on various pre-configured and pre-categorised data source types, for example, RDBMS, LDAP, XMLDB, XML, HTML, TEXT format of multiple data source(s), while complex search conditions may be represented.

In the foregoing manner a system and a method for data retrieval from heterogeneous data sources is disclosed. Only several embodiments are described. However, it will be apparent to one skilled in the art in view of this disclosure that numerous changes and/or modifications may be made without departing from the scope of the invention.

The invention claimed is:

1. A method for searching and retrieving data from a plurality of heterogeneous data sources, through a network interface, comprising:
   configuring and selecting, at a configure element, at least one data source from which to retrieve data, from said plurality of heterogeneous data sources;
   wherein the configure element is in communication with each data source;

each of said data sources is associated with at least one corresponding data source type or data source owner;

a data source owner of said at least one data source uses meta-data information to pre-configure data of said data source based on said data source type or data source owner;

said selection is based on said pre-configured data of said data source type or data source owner;

retrieving said data in accordance with a task request, using a search element in communication with the configure element and each selected data source;

wherein communication between the data sources and the configure element and the search element is via search translators;

wherein each of said search translators is associated with one of said data source type or data source owner;

wherein each of said search translators verifies that a search request syntax provided by said search element is appropriate to its corresponding data source type or data source owner; and wherein said search translators are selected from a group consisting of SQL translators, X-QUERY translators, XPATH translators, and Directory SDK for Java translators.

2. A method according to claim 1, wherein a data source configurator of the configure element, in communication with each of the data sources, configures and selects the data sources, and wherein said data source types are selected from a group consisting of a database management system, a relational database management system, an extensible markup language database, a light-weight directory access protocol, an extensible markup language file, a hypertext markup language file, and a text file.

3. The method of claim 1, wherein said data comprises only a portion of a data record available within said at least one data source.

4. The method of claim 1, wherein said search element further comprises a search manager that formulates said task request and a search filter that filters the retrieved data based on said task request.

5. The method of claim 4, wherein said search manager formulates said task request based on at least one of a data source owner and said data source types.

6. The method of claim 1, wherein the configure element comprises a data source configurator operable to communicate with each of the data sources and an administrative element operable to communicate with the search element.

7. The method of claim 1, wherein said task request specifically includes said one or more data source types that are provided by a requester.

8. A computer system comprising:
a data storage medium;
a network interface for communicating between said data storage medium and said data sources;
a user interface in communication with said network interface and said data storage medium;
wherein said computer system implements a computer program for searching and retrieving data from said plurality of heterogeneous data sources, the program comprising:
a configure element for communicating with each data source, wherein each data source has at least one associated data source type or data source owner;
a data source owner of said at least one data source uses meta-data information to pre-configure data of said data source based on said data source type or data source owner;

said configure element is configured to configure and select at least one data source from which to retrieve data;

the selection is based on said pre-configured data of said data source type or data source owner;

a search element for communicating with the configure element and each selected data source, said search element configured to retrieve said data from at least one of the heterogeneous data sources in accordance with a task request;

a search translator for each data source, to communicate with both the configure element and the search element;

wherein said data storage medium stores at least the retrieved data;

said user interface is configured to allow a user to provide said request and view said retrieved data;

wherein each of said search translators is associated with one of said data source type or data source owner;

wherein each of said search translators verifies that a search request syntax provided by said search element is appropriate to its corresponding data source type or data source owner; and wherein said search translators are selected from a group consisting of SQL translators, X-QUERY translators, XPATH translators, and Directory SDK for Java translators.

9. A system according to claim 8, wherein said data source types are selected from a group consisting of a database management system, a relational database management system, an extensible markup language database, a light-weight directory access protocol, an extensible markup language file, a hypertext markup language file, and a text file.

10. The system according to claim 8, wherein said data comprises only a portion of a data record available within said data source.

11. A system according to claim 8, wherein the configure element comprises a data source configurator operable to communicate with each of the data sources and an administrative element operable to communicate with the search element.

12. A system according claim 8, wherein the search element comprises a search manager operable to communicate with each selected data source and a search filter operable to communicate with the configure element.

13. The system according to claim 12, wherein said search manager formulates said task request and said search filter filters the retrieved data based on said task request.

14. The system according to claim 13, wherein said search manager formulates said task request based on at least one of said data source owner and said data source types.

15. The system according to claim 14, wherein said data source owner uses said configure element to configure said data source types.

16. A system according to claim 8, further comprising an index element in communication with the search element and the configure element for storing characteristics of information relating to the data sources.

17. The system of claim 8, wherein said search translators, said configure element and said search element are located on said data storage medium.

18. The system of claim 8, wherein at least one of said search translators is located on a server containing at least one of said heterogeneous data sources.

19. The system of claim 8, wherein said task request specifically includes said one or more data source types that are provided by a requester.

* * * * *